United States Patent [19]

Takahashi

[11] Patent Number: 4,707,802

[45] Date of Patent: Nov. 17, 1987

[54] SEMICONDUCTOR INTEGRATED CIRCUIT DEVICE SELECTED BY AN ADDRESS SIGNAL

[75] Inventor: Hitoshi Takahashi, Tokyo, Japan

[73] Assignee: Fujitsu Limited, Kawasaki, Japan

[21] Appl. No.: 534,135

[22] Filed: Sep. 20, 1983

[30] Foreign Application Priority Data

Sep. 30, 1982 [JP] Japan .............................. 57-169542

[51] Int. Cl.⁴ ............................................. G06F 12/02
[52] U.S. Cl. .................................................. 364/900
[58] Field of Search ... 364/200 MS File, 900 MS File; 365/230

[56] References Cited

U.S. PATENT DOCUMENTS

| | | | |
|---|---|---|---|
| 3,975,714 | 8/1976 | Weber | 364/200 |
| 4,220,991 | 9/1980 | Hamano | 364/900 |
| 4,296,467 | 10/1981 | Nibby | 364/200 |
| 4,481,579 | 11/1984 | Kinghorn | 364/200 |
| 4,558,410 | 12/1985 | Holzner | 364/200 |

*Primary Examiner*—David Y. Eng
*Assistant Examiner*—Emily Yue Chan
*Attorney, Agent, or Firm*—Staas & Halsey

[57] ABSTRACT

A semiconductor IC device such as a peripheral interface LSI device used in a data processing system comprises an address memory for storing the chip address of the device itself and a comparator for comparing an address signal input thereto from an external circuit with the content of the address memory. Address data existing on a bus line in an initial setting status is previously stored in the address memory as a chip address of the device. The device enters a chip selected condition depending on the coincidence between the address signal from the external circuit and the content of the address memory.

12 Claims, 6 Drawing Figures

SEMICONDUCTOR INTEGRATED CIRCUIT DEVICE SELECTED BY AN ADDRESS SIGNAL

BACKGROUND OF THE INVENTION (1) Field of the Invention

The present invention relates to a semiconductor integrated circuit (IC) device, more particularly to a semiconductor IC device such as an IC chip of a memory device or an input/output (I/O) control device which is selected and used by an address signal from a central processing unit (CPU).

(2) Description of the Prior Art

Generally, in a computer system, a plurality of peripheral circuits such as memory devices and I/O control devices are used. Each of the peripheral circuits may, for example, be a peripheral large scale integration (LSI) chip and include a memory device or an I/O controls circuit which control various I/O devices.

In such a computer system, when the CPU accesses a peripheral IC chip, it is necessary to input a chip select signal to the chip select terminal of the peripheral IC chip and, thereafter, to input data to or output data from the peripheral IC chip.

A computer system using conventional peripheral IC devices requires an address decoder. Thus, the interface circuit between the CPU and each LSI is complex. Moreover, the address of each peripheral LSI is absolutely determined in correspondence to the structure of the address decoder. Thus, it is impossible to use a program designed for one computer system in another computer system using the same CPU, if the addresses of the peripheral LSI's do not coincide with that of the former computer system. Therefore, software for computer systems using conventional peripheral IC's is generally not interchangeable.

SUMMARY OF THE INVENTION

In order to eliminate the above-mentioned problems of the conventional system, the present invention uses an address memory on a peripheral IC chip for storing the address of the peripheral IC chip and a comparator within the peripheral IC chip which enables access to the peripheral IC chip on the basis of address data from a CPU.

It is an object of the present invention to simplify interface circuits between a CPU and each peripheral chip and to make software between computer systems using the same type of CPU interchangeable.

According to the present invention, a semiconductor IC device, used in a data processing system, includes an address memory for storing a chip address of the device itself and a comparator for comparing an address signal input thereto from an external circuit with the content of the address memory. Address data existing on a bus line in an initial setting mode is stored in the address memory as the chip address of the device. The device enters a chip selected condition when there is coincidence between the address signal and the content of the address memory.

DESCRIPTION OF THE PREFERRED EMBODIMENTS

Figure 1:
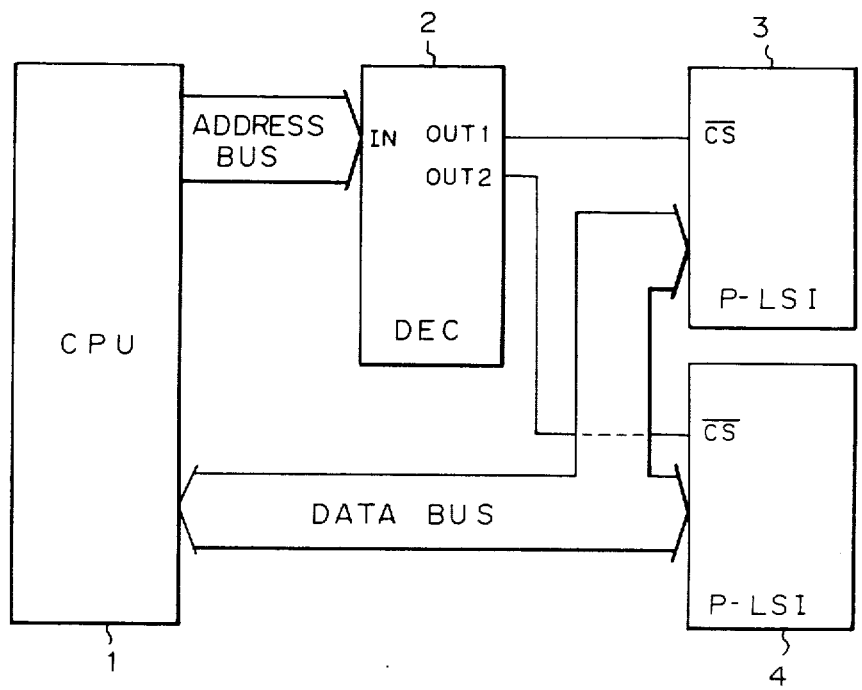
FIG. 1 is a block circuit diagram of a computer system which uses conventional semiconductor IC devices.

Before describing the preferred embodiments, an explanation will be given of a computer system which uses conventional peripheral semiconductor devices with reference to FIG. 1. The system of FIG. 1 comprises a CPU 1, an address decoder 2, and peripheral LSI's 3 and 4. In the system of FIG. 1, the address decoder 2 includes an interface circuit for the CPU 1, the peripheral LSI's 3 and 4, and so on. The peripheral LSI's 3 and 4 may be memory devices, I/O control devices, and so on.

In the system of FIG. 1, an address signal from the CPU 1 is input to the address decoder 2 via an address bus. The address decoder 2 decodes the address signal and lowers the potential of the chip select terminal $\overline{CS}$ of the peripheral LSI corresponding to the address signal. For example, when it is necessary to select the peripheral LSI 3, the CPU outputs the address signal which corresponds to the peripheral LSI 3. The address decoder 2 receives this address signal and lowers the potential of the $\overline{CS}$ terminal of peripheral LSI 3 only. Thereby, the peripheral LSI 3 is selected, and the delivery of data between the peripheral LSI 3 and the CPU 1 is effected via the data bus.

In this way, a peripheral LSI is selected by outputting an address signal from the CPU 1 which corresponds to the peripheral LSI and the I/O operation and so on are performed. As mentioned earlier, this system has the disadvantages of a complex interface circuit and lack of software interchangeability.

According to the present invention, there is provided a semiconductor IC device which overcomes these problems.

Figure 2:
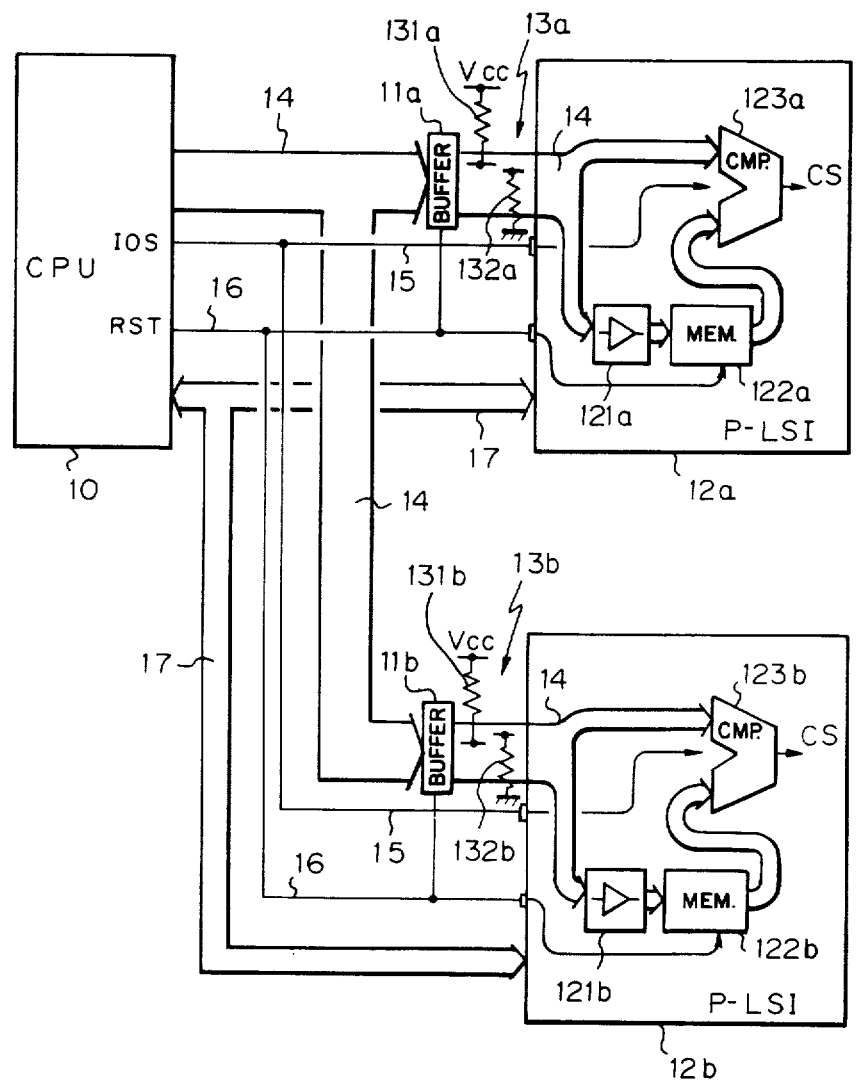
FIG. 2 is a block circuit diagram of a computer system which uses semiconductor IC devices according to a first embodiment of the present invention.

In a first embodiment, the semiconductor IC device is an LSI comprising an input buffer, an address memory, and a comparator. FIG. 2 illustrates an example of a computer system which uses semiconductor IC devices according to the first embodiment of the present invention. The computer system of FIG. 2 includes a CPU 10, bus buffers 11a and 11b, peripheral LSI's 12a and 12b, address setting circuits 13a and 13b, and so on. The bus buffers 11a and 11b are inserted midway along a bus line 14 which may be an address bus and which connects the CPU 10 and the peripheral LSI's 12a and 12b. The CPU 10 is connected to the semiconductor IC devices, i.e., peripheral LSI's 12a and 12b, via a data bus 17, an I/O selecting line 15, and a reset signal line 16 in addition to the bus line 14.

In FIG. 2, only two peripheral LSI's are illustrated. However, in practice, it is possible to connect more than two peripheral LSI's to the CPU 10 via the bus line 14, the I/O selecting line 15, the reset signal line 16 and the data bus 17. The peripheral LSI's 12a and 12b comprise input buffers 121a and 121b, address memories 122a and 122b, and comparators 123a and 123b, respectively, which are connected to the bus line 14.

The address setting circuit 13a comprises one or more resistors 131a and/or one more resistors 132a. The resistors 131a are connected between a power source $V_{cc}$ and one or more signal lines corresponding to predetermined bits of the bus line 14 having a plurality of signal lines. The resistors 132a are connected between one or more signal lines corresponding to the other bits of the bus line 14 and ground. Therefore, these resistors of the address setting circuit 13a serve to add a high level voltage or a low level voltage to the signal lines corresponding to predetermined bits, thereby inputting a predetermined address signal to the peripheral LSI 12a.

The address setting circuit 13b similarly comprises one or more resistors 131b and/or one or more resistors 132b. The resistors 131b are connected between a power source $V_{cc}$ and one or more signal lines corresponding to predetermined bits of the bus line 14. The resistors 132b are connected between one or more signal lines corresponding to the other remaining bits of the bus line 14 and ground, thereby inputting a predetermined address signal to the peripheral LSI 12b.

In the computer system of FIG. 2, the reset signal line 16 connected to a reset terminal RST of the CPU 10 has an active status when the initial setting of the computer system is performed, for example, when the power source to the computer system is turned on. At this time, the bus buffers 11a and 11b enter a turned-off state, and the CPU 10 and peripheral portions such as the peripheral LSI's 12a and 12b are separated. Since the CPU 10 is disconnected, address signals are transmitted to the peripheral LSI's 12a and 12b by the address setting circuits 13a and 13b, respectively, which are connected to the bus line 14 on the side of the peripheral LSI's 12a and 12b. In other words, some of the signal lines of the bus line 14 corresponding to bits of the address signal are pulled up to the level of power source $V_{cc}$ via the resistors 131a and 131b and the remained signal lines connected to ground via the resistors 132a and 132b are lowered.

The address signals applied to the bus line 14 in this manner are transmitted to the address memories 122a and 122b via the internal buffers 121a and 121b of the peripheral LSI's 12a and 12b and are stored therein as the logical numbers of the peripheral LSI's 12a and 12b, respectively. The logical numbers are written into the address memories 122a and 122b which are placed in a write-in mode by the reset signal supplied via the reset signal line 16.

When the CPU 10 accesses one of the peripheral LSI's after the logical number, i.e., the address of each peripheral LSI, is stored in the above-described manner, the address of a peripheral LSI is transmitted from the CPU 10 via the bus line 14 and the potential of the I/O selecting line 15 is set high, so that the I/O selecting signal is active. In each of the peripheral LSI's, the comparator 123a or 123b is enabled and compares the address data from the CPU 10 and its own logical number read from the address memory 122a or 122b. That is, the CPU 10 informs the comparators 123a and 123b that the data on the bus line 14 at present is the address data supplied to the peripheral LSI's, by setting the potential of the I/O line 15 high.

If, for example, in the peripheral LSI 12a, the aforementioned two data input by bus line 14 and read from address memory 122a are compared by the comparator 123a and found to coincide, the comparator 123a outputs a coincidence signal. The coincidence signal or chip select signal CS is supplied to the chip select terminal of a peripheral circuit which is provided in the peripheral LSI (not shown). In this way, the address data transmitted from the CPU 10 and the logical number stored in each peripheral LSI is compared, and the peripheral LSI whose logical number coincides with the address data is selected, permitting I/O operation by the selected peripheral LSI.

Many changes are possible in the operations described above, for example, it is possible to utilize either a data bus or an address bus as the bus line 14. It should also be noted that, in the system of FIG. 2, it is not necessary to use the I/O selecting signal supplied by I/O line 15 from the IOS terminal of the CPU 10, when each of the peripheral LSI's and memory devices connected to the CPU 10 are selected by address signals for the same address space.

Figure 3:
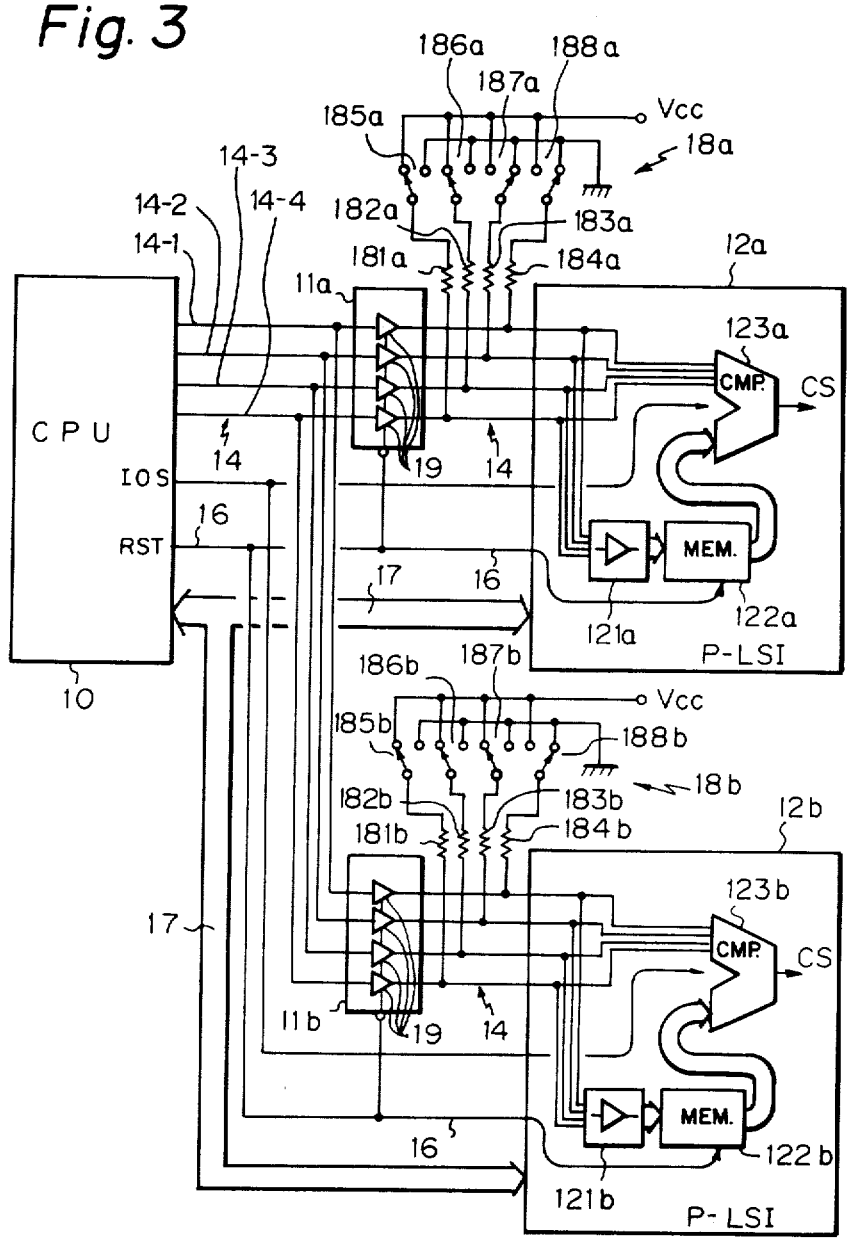
FIG. 3 is a block circuit diagram of another computer system which uses semiconductor IC devices according to the first embodiment of the present invention.

FIG. 3 illustrates another computer system which uses semiconductor IC devices according to the first embodiment of the present invention. Parts similar to those in FIG. 2 are given the same reference numerals. The difference between the systems of FIGS. 2 and 3 is that address setting circuits 18a and 18b are used instead of circuits 13a and 13b. The address setting circuit 18a comprises resistors 181a through 184a and switches 185a through 188a. The address setting circuit 18b comprises resistors 181b through 184b and switches 185b through 188a. The bus line 14 thus comprises, for example, four signal lines 14-1, 14-2, 14-3, and 14-4. Each of bus buffers 11a and 11b similarly comprises four buffer amplifiers 19 connected to the signal lines 14-1, 14-2, 14-3, and 14-4, respectively, each of which is activated by the reset signal sent from the CPU 10 via the reset signal line 16.

In the system of FIG. 3, the logical number of each of the peripheral LSI's 12a and 12b is changeable by the switches 185a through 188a of the address setting circuit 18a and the switches 185b through 188b of the address setting circuit 18b. When the reset signal is active during the initial setting mode, all the buffer amplifiers 19 in each of the address setting circuits 11a and 11b are turned off. The address setting circuits 18a and 18b transmit address signals to the peripheral LSI's 12a and 12b, respectively. The contents of the address signals, i.e., the logical numbers of the peripheral LSI's 12a and 12b, are determined by the condition of the switches 185a through 188a and the switches 185b through 188b, respectively.

According to a second embodiment, the semiconductor IC device is an LSI comprising an input buffer, an address memory, a comparator, a flip-flop, inverters, and a data buffer.

Figure 4:
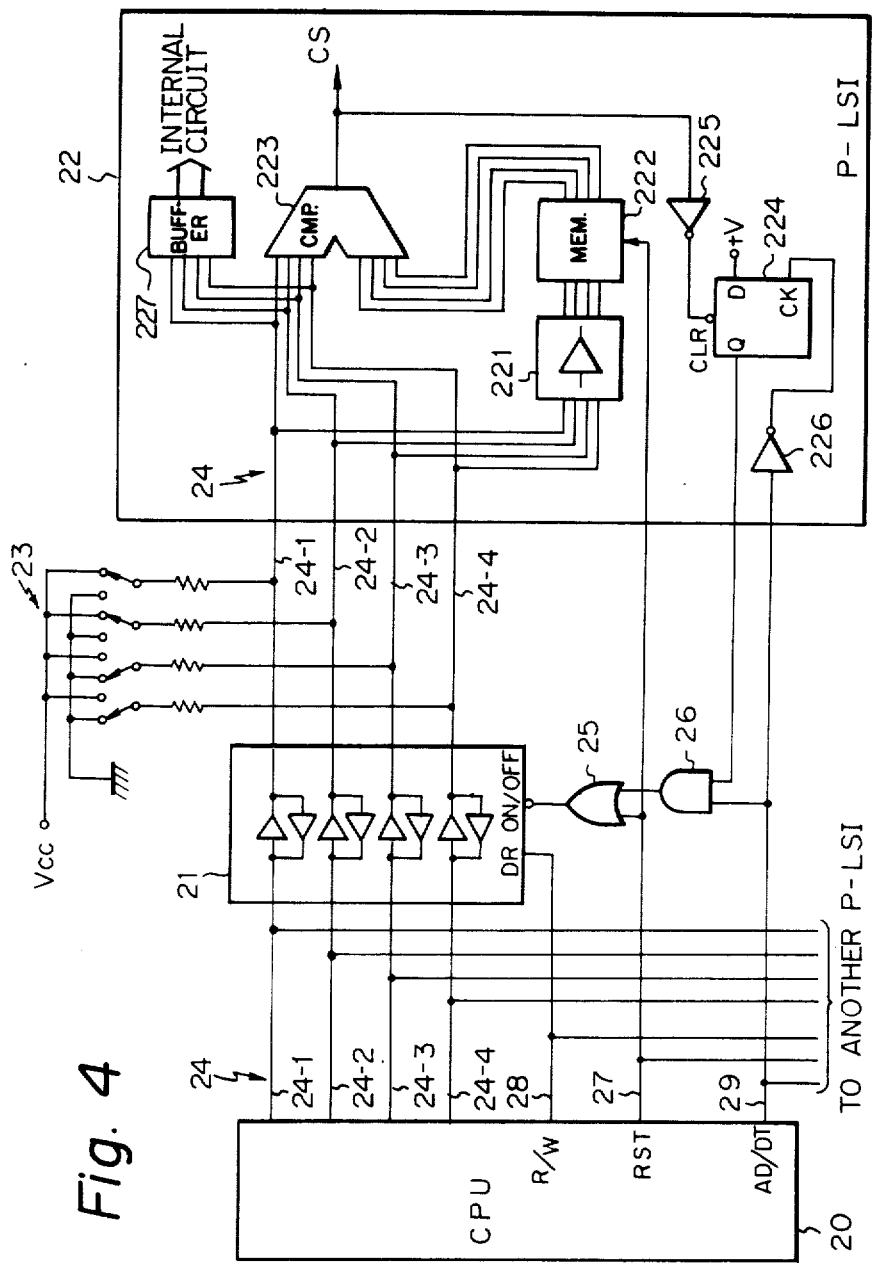
FIG. 4 is a block circuit diagram of still another computer system which uses semiconductor IC devices according to a second embodiment of the present invention.

FIG. 4 illustrates an example of a computer system which uses semiconductor IC devices according to the second embodiment of the present invention. The computer system of FIG. 4 includes a CPU 20, a bus buffer 21, a peripheral LSI 22, an address setting circuit 23, an OR gate 25, and an AND gate 26. In the system of FIG. 4, a common bus line 24 is used as an address bus and a data bus in a time division manner depending on the potential level of a bus switching signal AD/DT. The bus line 24 comprises, for example, four signal lines 24-1, 24-2, 24-3 and 24-4 which connect the CPU 20 and the peripheral LSI 22 via the bus buffer 21.

In FIG. 4, only one peripheral LSI 22, one bus buffer 21, and so on are illustrated. However, in an actual system, many peripheral LSI's and so on are connected to the CPU 20. The bus buffer 21 comprises dual-direction three-state buffer circuits which are controlled by a direction signal DR and ON/OFF signal. The peripheral LSI 22 comprises an input buffer 221, an address memory 222 and a comparator 223, as in the first embodiment, and further comprises a flip-flop 224, inverters 225 and 226, and a data buffer 227 inserted between the bus line 24 and internal circuits (not shown) of the peripheral LSI 22. The address setting circuit 23 is the same as that of FIG. 3.

In the system of FIG. 4, a reset signal on a reset signal line 27 connected to the reset terminal RST of the CPU 20 is active during the initial setting of the computer system. The reset signal is supplied to the ON/OFF terminal of the bus buffer 21 via the OR gate 25, causing the bus buffer 21 to enter a turned-off state and the CPU 20 and the peripheral LSI 22 are separated. Therefore, an address signal, i.e., a logical number, is transmitted from the address setting circuit 23 to the address memory 222 and stored therein in a manner similar to the computer system of FIG. 3.

Figure 5A:
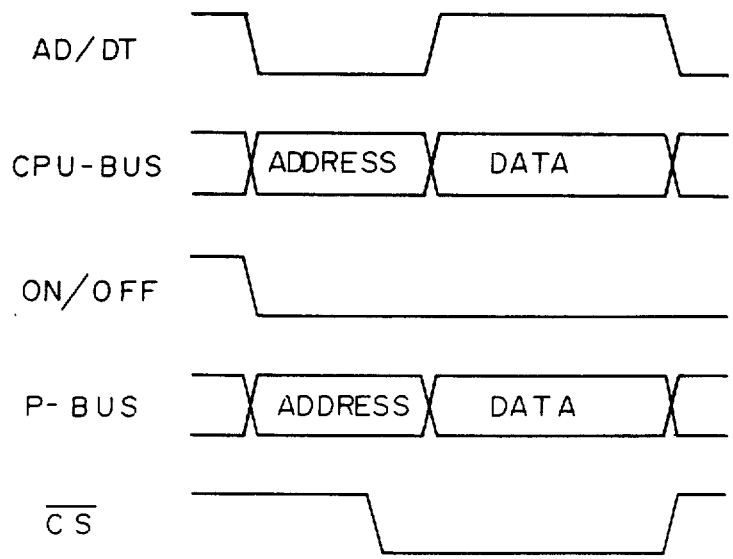
FIGS. 5A and 5B are waveform diagrams of the operation in the system of FIG. 4.
Figure 5B:
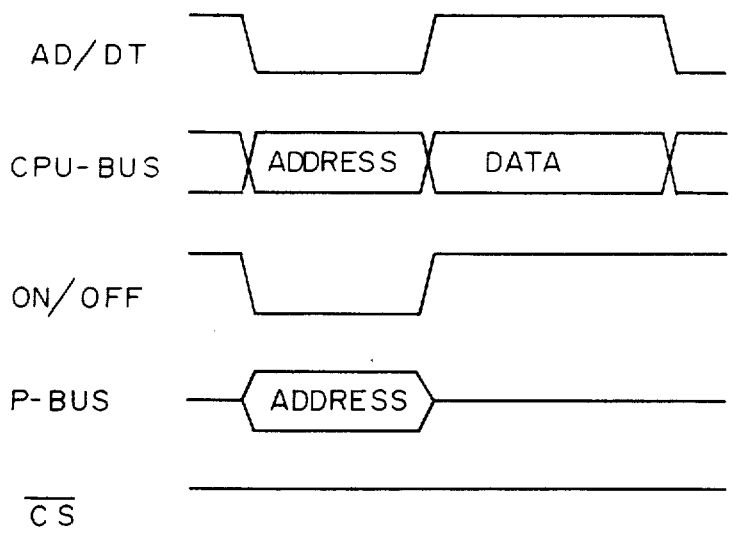

FIGS. 5A and 5B illustrate signals in the system of FIG. 4 for the cases in which the CPU 20 accesses the peripheral LSI 22 when it is and is not selected, respectively. When the CPU 20 accesses one of the peripheral LSI's connected thereto after the logical numbers are preset therein in the above-described manner, the CPU 20 outputs a low bus switching signal AD/DT and sends out an address of a peripheral LSI 22 on a CPU-bus, i.e., on the portion of the bus line 24 connected to the CPU 20. Since the output signal of the AND gate 26 is low and the ON/OFF signal is low, the bus buffer 21 enters a turned-on state. The direction signal DR is set high, for example, and the three-state buffer circuits in the bus buffer 21 are activated, so that signals are transmitted from the CPU 20 to the peripheral LSI 22. Therefore, the address signal sent from the CPU 20 is input to the comparator 223 and compared with the logical number stored in the address memory 222.

If the content of the address signal coincides with the logical number, the comparator 223 sets the chip select signal CS to high, so that the peripheral LSI 22 is selected. Therefore, the inverted chip select signal $\overline{CS}$, i.e., the output signal of the inverter 225 is low, as illustrated in FIG. 5A. Next, the CPU 20 sets the bus switching signal AD/DT high and sends out or receives data via the bus line 24. Since the inverted chip select signal $\overline{CS}$ supplied to the clear terminal CLR of the flip-flop 224 is low, the output signal (Q) of the flip-flop 224 is low. Therefore, the output signal of the AND gate 26 and the output signal of the OR gate 25 are low, and the ON/OFF signal stays at a low level.

If the content of the address signal sent from the CPU 20 does not coincide with the logical number stored in the address memory 222, the comparator 223 sets the chip select signal CS low, so that the peripheral LSI 22 is not selected. In this state, when the CPU 20 sets the bus switching signal AD/DT high, the output of the flip-flop 224 becomes high and the output signal of the AND gate 26 becomes high. Therefore, the ON/OFF signal becomes high and the bus buffer 21 is turned off, so that the data sent from the CPU 20 is not transmitted to the peripheral LSI 22, as illustrated in FIG. 5B.

In the system of FIG. 4, it is not necessary to provide extra pin terminals in each peripheral LSI for inputting a logical number thereto, because the logical number is input thereto via pin terminals used for transmitting data signals.

As described above, according to the present invention, it is not necessary to use complex hardware, such as the address decoder and so on used in a conventional computer system. Also, the interface circuits between a central processing unit and peripheral circuits are simplified. Since the number of peripheral LSI's is usually not large, it is not necessary to connect to the peripheral LSI's signal lines corresponding to all the bits of a bus line which connects the central processing unit and the peripheral LSI's. It is only necessary to connect to the peripheral LSI's the signal lines of the bit numbers, e.g., four, determined by the number of peripheral LSI's. Therefore, it is possible to decrease the number of connections between the CPU and the peripheral circuits. When switches are provided in the address setting circuit, as in FIG. 4, for connecting the resistor pattern coupled to each signal line to a power source or ground, it is possible to put any logical number in each peripheral LSI so that the logical number coincides with the logical number determined in each of the programs executed by the CPU. Therefore, it is possible to make interchangeable many programs for computer systems using the same CPU.

I claim:

1. A data processing system operating in an initial setting mode and a chip selected mode and including a central processing unit for generating a chip address signal and a reset signal indicating one of the initial setting mode and the chip selected mode, said data processing system comprising:

address setting means, connected to said central processing unit, for generating chip address data during the initial setting mode, and for transferring the chip address signal from the central processing unit during the chip selected mode; and a semiconductor integrated circuit, connected to said address setting means to receive the chip address data corresponding to said semiconductor integrated circuit during the initial setting mode and for receiving the chip address signal from the central processing unit via said address setting means during the chip selected mode, said semiconductor integrated circuit comprising:

an address memory, connected to the address setting means, for storing the chip address data;

a comparator, connected to said address setting means and said address memory, for comparing the address signal from the central processing unit with the chip address data in said address memory to determine coincidence therebetween during the chip selected mode, said semiconductor integrated circuit entering a chip selected condition when said comparator detects coincidence between the address signal and the chip address data; and an internal circuit, connected to said comparator, for performing an operation when said semiconductor integrated circuit is addressed in the chip selected mode.

2. A data procesing system according to claim 1, further comprising:

a bus line connected to the central processing unit; and a bus buffer, connected between said bus line and said address setting means, the bus buffer being turned on during the chip selected mode and turned off to separate said central processing unit and said semiconductor integrated circuit during the initial setting mode.

3. A data processing system according to claim 2, further comprising a voltage source, and
wherein said address setting means comprises:
   a signal line connecting said bus buffer to said address memory and said comparator; and
   a resistor connected between said signal line and one of the voltage source and ground.

4. A data processing system according to claim 2, further comprising a voltage source, and
wherein said address setting means comprises:
   a signal line connected to said bus buffer and said semiconductor integrated circuit;
   a resistor connected to the signal line; and
   a switch, connected to the resistor, the voltage source and ground, for connecting the resistor to one of the voltage source and ground.

5. A data processing system according to claim 2,
wherein the central processing unit sends a reset signal to said bus buffer during the initial setting mode, and
wherein said address memory enters a write-in mode and said bus buffer is turned off by the reset signal generated by the central processing unit during the initial setting mode, the chip address data being provided by said address setting means and written into said address memory.

6. A data processing system according to claim 1, further comprising:
   a voltage source; and
   a bus line operatively connected to the central processing unit and said address setting means, and
wherein said address setting means comprises:
   a signal line connected to said bus line and said semiconductor integrated circuit; and
   a resistor connected to the signal line and one of the voltage source and ground.

7. A data processing system according to claim 1, further comprising:
   a voltage source; and
   a bus line connected to the central processing unit and said address setting means, and
wherein said address setting means comprises:
   a signal line connected to said bus line and said semiconductor integrated circuit;
   a resistor connected to the signal line; and
   a switch, connected to the resistor, the voltage source and ground, for selecting between the voltage source and ground.

8. A semiconductor integrated circuit device in a data processing system including a bus line and a central processing unit, operatively connected to the bus line generating a chip address signal, a reset and a bus switching signal, said semiconductor integrated circuit device comprising:
   a bus buffer, operatively connected to the bus line, having an on/off terminal;
   address data means, connected to said bus buffer, for generating chip address data during an initial setting mode;
   a signal line connected to said bus buffer and said address data means;
   an address memory, connected to said signal line, for storing the chip address data, received via the signal line, as a chip address of said semiconductor integrated circuit device;
   a comparator, connected to said signal line and said address memory, for comparing the chip address data from said address memory with the chip address signal from the central processing unit, receiving via the bus line, said bus buffer and said signal line, and for generating a coincidence signal indicating one of coincidence and non-coincidence of the chip address signal and the chip address data;
   a first inverter, connected to said comparator, for inverting the coincidence signal;
   a second inverter connected to the central processing unit to receive and invert the bus switching signal;
   a flip-flop connected to said first and second inverters;
   an AND gate, having inputs connected to said flip-flop and the central processing unit to receive the bus switching signal, and having an output, for generating a buffer signal which turns on said bus buffer when the coincidence signal indicates coincidence between the chip address signal and the chip address and turning off the bus buffer when the bus switching signal changes; and
   an OR gate, having inputs connected to the output of said AND gate and the central processing unit to receive the reset signal and an output operatively connected to the on/off terminal of said bus buffer, for ORing the reset signal and the buffer signal.

9. A peripheral circuit addressing system connected to a bus line of a data processing system which generates an address signal on the bus line and indicates one of an initial setting mode and an operating mode by a reset signal, comprising:
   interface and address means, connected to the bus line, for supplying the address signal from the bus line during the operating mode and providing a pheripheral circuit address during the initial setting mode: and
   a peripheral circuit comprising:
      an address memory, connected to said interface and address means, for receiving the peripheral circuit address during the initial setting mode and for storing the address of said peripheral circuit;
      a comparator, connected to said interface and address means and said address memory, for comparing the address signal with the address of said peripheral circuit and outputting a coincidence signal when there is coincidence between the address signal and the address of said peripheral circuit; and
      an internal circuit, connected to said comparator, for performing a peripheral circuit function in dependence upon the coincidence signal.

10. A peripheral circuit addressing system as recited in claim 9, wherein the data processing system includes a voltage supply and said interface and address means comprises:
   a bus buffer connected to said bus line;
   signal lines connecting said bus buffer to said address memory and said comparator;
   a first resistor connected to the voltage supply and one of said signal lines; and
   a second resistor, connected to another of said signal lines and ground, said first and second resistors providing the address of said peripheral circuit to said address memory in the initial setting mode.

11. A peripheral circuit addressing system as recited in claim 9, wherein the data processing system further comprises a voltage supply and said interface and address means comprises:
  a bus buffer connected to the bus line;
  signal lines connected to connecting said bus buffer to said address memory and said comparator;
  resistors connected to the signal lines; and
  switching means, connected to said resistors, the voltage supply and ground, for selecting between the voltage supply and ground for connection to each of said resistors to provide the address of said peripheral circuit during the initial setting mode.

12. A peripheral circuit addressing system for a peripheral circuit in a data processing system having a bus connected to a processing unit for generating an address signal, a bus switching signal and a reset signal on the bus, said peripheral circuit addressing system comprising:
  an AND gate having first and second inputs and an output, the first input connected to the bus to receive the bus switching signal;
  an OR gate having inputs connected to the output of said AND gate and to the bus to receive the reset signal and having an output;
  a bus buffer connected to the bus and the output of said OR gate;
  address data means, connected to said bus buffer and the peripheral circuit, for transferring data between the bus buffer and the peripheral circuit, for supplying the address signal from the bus for providing a peripheral circuit address during an initial setting mode;
  an address memory, connected to said address data means and the bus, for receiving and storing the peripheral circuit address during the initial setting mode in dependence upon the reset signal;
  a comparator, connected to said address data means, said address memory and the peripheral circuit, for comparing the address signal with the periheral circuit address and outputting a coincidence signal to the peripheral circuit when there is coincidence between the address signal and the peripheral circuit address; and
  control means having inputs connected to said comparator and the bus to receive the bus siwtching signal and having an output operatively connected to the second input of said AND gate, for producing a control signal to turn off said bus buffer when the coincidence signal from said comparator indicates non-coincidence.

* * * * *

UNITED STATES PATENT AND TRADEMARK OFFICE
CERTIFICATE OF CORRECTION

PATENT NO. : 4,707,802
DATED : November 17, 1987
INVENTOR(S) : Takahashi

It is certified that error appears in the above-identified patent and that said Letters Patent is hereby corrected as shown below:

Column 10, line 13, "periheral" should be --peripheral--;

line 19, "siwtching" should be --switching--.

Signed and Sealed this

Twenty-eighth Day of June, 1988

Attest:

DONALD J. QUIGG

Attesting Officer

Commissioner of Patents and Trademarks